United States Patent
Deshpande et al.

(10) Patent No.: US 7,636,463 B2
(45) Date of Patent: Dec. 22, 2009

(54) MULTI-PLANAR REFORMATING USING A THREE-POINT TOOL

(75) Inventors: Vibhas Deshpande, Los Angeles, CA (US); Gerhard Laub, Los Angeles, CA (US)

(73) Assignee: Siemens Aktiengesellschaft, Munich (DE)

( * ) Notice: Subject to any disclaimer, the term of this patent is extended or adjusted under 35 U.S.C. 154(b) by 687 days.

(21) Appl. No.: 11/312,792

(22) Filed: Dec. 20, 2005

(65) Prior Publication Data
US 2007/0165919 A1    Jul. 19, 2007

(51) Int. Cl.
*G06K 9/00* (2006.01)
*G06T 15/00* (2006.01)
*G06T 17/00* (2006.01)

(52) U.S. Cl. .......... 382/128; 382/154; 345/419; 345/424

(58) Field of Classification Search ......... 382/128–132; 345/419, 474; 600/431, 443
See application file for complete search history.

(56) References Cited

U.S. PATENT DOCUMENTS

| | | | | |
|---|---|---|---|---|
| 4,981,157 A | * | 1/1991 | Denkinger | 137/510 |
| 5,722,408 A | * | 3/1998 | Dehner et al. | 600/407 |
| 5,734,384 A | * | 3/1998 | Yanof et al. | 345/424 |
| 5,920,319 A | * | 7/1999 | Vining et al. | 345/420 |
| 6,968,032 B2 | * | 11/2005 | Mohr et al. | 378/8 |
| 7,003,175 B2 | * | 2/2006 | Paladini | 382/276 |
| 7,061,484 B2 | * | 6/2006 | Bailey et al. | 345/419 |
| 7,333,648 B2 | * | 2/2008 | Edic et al. | 382/131 |
| 7,349,520 B2 | * | 3/2008 | Nakashima | 378/4 |
| 2003/0197704 A1 | * | 10/2003 | Tek et al. | 345/474 |
| 2004/0070584 A1 | * | 4/2004 | Pyo et al. | 345/419 |
| 2005/0101864 A1 | * | 5/2005 | Zheng et al. | 600/443 |
| 2006/0093199 A1 | * | 5/2006 | Fram et al. | 382/128 |
| 2006/0152502 A1 | * | 7/2006 | Barth | 345/419 |

OTHER PUBLICATIONS

Printout from Siemens USA Medical website InSpace 3D Medical.
Printout from Siemens USA Leonardo Workstation.

* cited by examiner

*Primary Examiner*—Yubin Hung
*Assistant Examiner*—Andrae S Allison
(74) *Attorney, Agent, or Firm*—Schiff Hardin LLP

(57) ABSTRACT

In a method and system for displaying a medical image, a user defines three points in an anatomy of interest at different locations. A plane is then automatically generated from the three points.

21 Claims, 2 Drawing Sheets

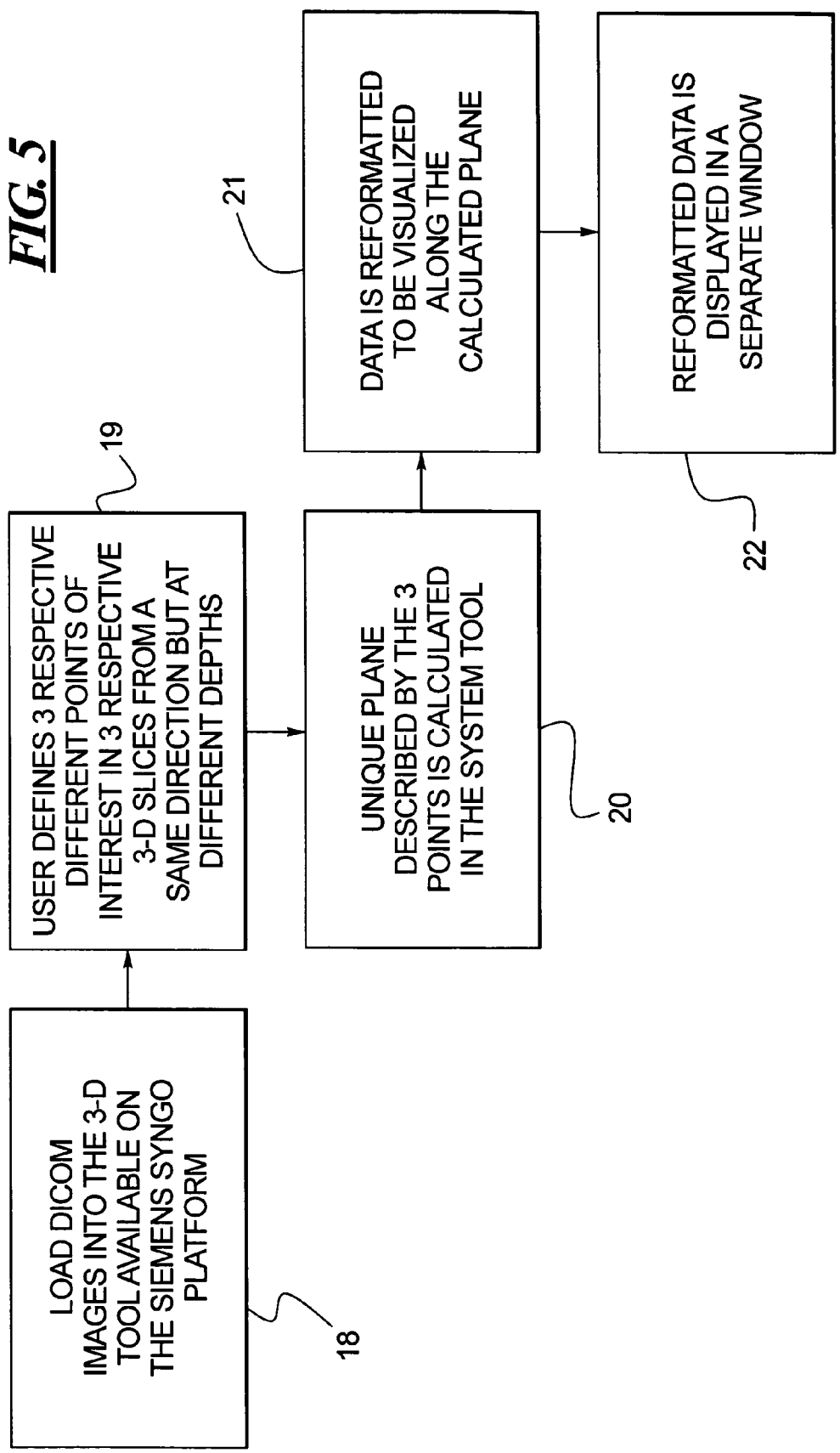

MULTI-PLANAR REFORMATING USING A THREE-POINT TOOL

BACKGROUND

Image post-processing, such as what is known as multi-planar reformatting (MPR) known in the prior art, is a task that is often encountered in magnetic resonance imaging (MRI). Once image data is loaded into post-processing programs, the user can generate views along any arbitrary planes by rotating the data set in 3-D space.

Multi-planar reformatting is the use of a 3-D image data set to create a data set representing an arbitrary slice plane of the 3-D image data set so that a slice image can then be viewed.

It is known in magnetic resonance imaging (MRI) using the Siemens AG, Munich, Germany, MRI imaging software known as the Syngo system, including the 3-D image post processing tool thereof, to display arbitrary planes also known as slices of a 3-D MRI image which has been stored. This prior art tool in the Syngo system can display such arbitrary slices of a portion of the human body, such as the heart. Such images are known in the prior art, as explained above, as multi-planar reformat (MPR) images. Such an arbitrary plane can be freely moved through the data cube representing the 3-D image.

In such prior art, however, for post-processing of images for multi-planar reformatting, such MPRs are performed manually by rotating the 3-D data set until the desired plane is visualized.

SUMMARY

It is an object to provide a three point tool which makes generation of multi-planar reformatting images much easier.

In a method for displaying a medical image, a user defines three points in an anatomy of interest at different locations. A plane is then automatically generated from the three points.

BRIEF DESCRIPTION OF THE DRAWINGS

FIG. 5 is a block diagram of a flowchart of a workflow for a three point tool for multi-planar reformatting.

DESCRIPTION OF THE PREFERRED EMBODIMENT

Figure 3:
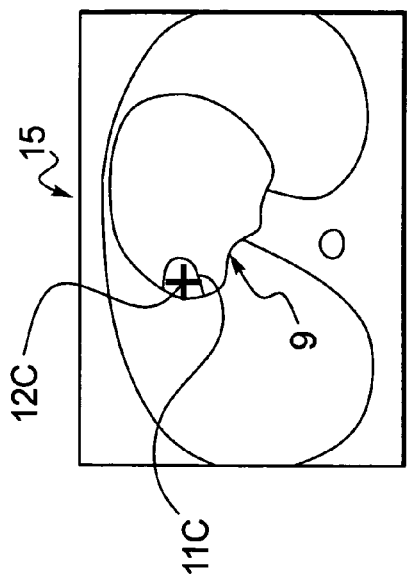
FIG. 3 shows a third plane in said given direction at a third depth of the heart right coronary artery of FIG. 1 taken from the 3-D MRI data set in which a third point is defined.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

FIGS. 1, 2, 3, and 4 show an example of the use of a three-point tool for multi-planar reformatting (MPR) described herein. The three different planar images (slice images or slices) 10, 13 and 15 in FIGS. 1, 2, and 3 taken from the same 3-D data set stored in a memory of a computer being operated, for example, with the prior art commercially available Siemens Syngo platform and the 3-D image post processing tool, but which has been improved as described herein. Unlike the prior art, in FIGS. 1, 2 and 3 the three images may be all taken in different directions and/or different depths, and three points 12A, 12B, and 12C are identified with a cursor symbol "+" in the different depth slices 10, 13 and 15 in this illustration in the 3-D data set. These images respectively show an origin 11A of the right coronary artery (RCA) of a heart in FIG. 1, a middle portion 11B of the same RCA in FIG. 2, and a distal portion 11C of the same RCA in FIG. 3.

Figure 2:
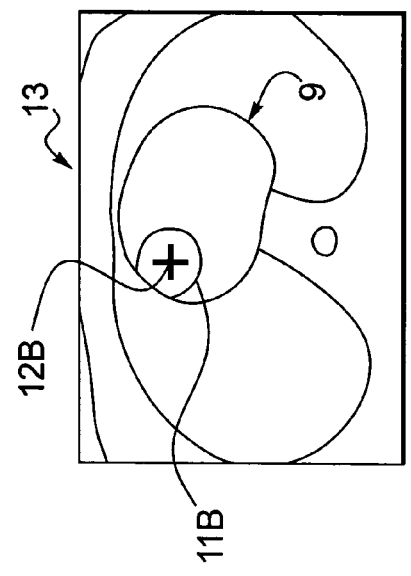
FIG. 2 shows a second plane in said given direction at a second depth of the heart right coronary artery of FIG. 1 taken from the 3-D MRI data set in which a second point is defined.
Figure 1:
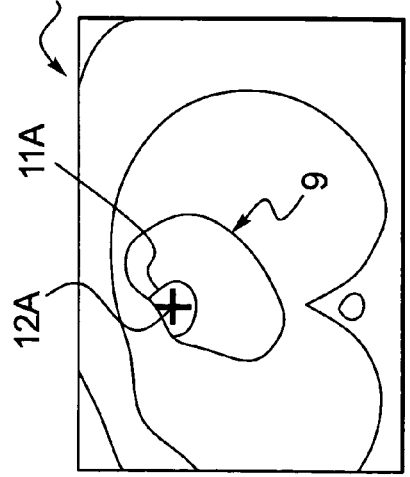
FIG. 1 shows a first plane in a given direction at a first depth of the human anatomy such as a right coronary artery of a heart taken from a 3-D MRI data set in which a first point is defined.
Figure 4:
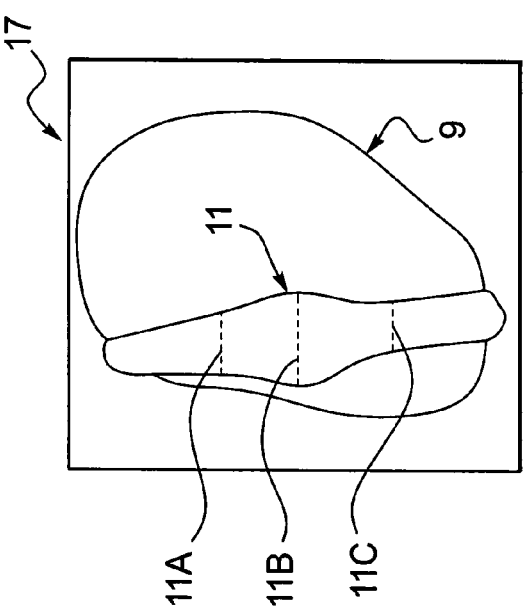
FIG. 4 shows a resultant plane image of the heart right coronary artery defined by the first, second and third points defined in FIGS. 1, 2, and 3.

FIG. 4 shows a resultant plane defined by the identified points in FIGS. 1, 2, and 3, and which then shows the RCA 18 in the image 17, which is a plane defined by the three points 12A, 12B, and 12C.

Any three points in space describe a unique plane. This principle is used in the present preferred embodiment as a three-point tool in the software improvement to the Siemens Syngo platform 3-D image post processing tool. By using the three points 12A, 12B, and 12C defined in FIGS. 1, 2 and 3 viewing the right coronary artery from different perspectives from the same direction but in three different depth slices, the tool now automatically calculates the plane of the resulting image 17 shown in FIG. 4. The same could be performed using three slices visualizing the same 3D data from different orientations and at different depths instead of in the same direction and at different depths.

FIG. 5 is a block diagram of the workflow for using the three point tool for multi-planar reformatting. As indicated in FIG. 5, at block 18 DICOM images are loaded into the 3-D tool of the prior art Siemens Syngo system (DICOM is a standard for medical imaging defined as Digital Imaging and Communications in Medicine). As shown at block 19 according to the preferred embodiment, the user defines three different points of interest at three distinct points in the 3D data, visualizing from any direction and at any depth. As shown at 20, the unique plane described by the three points is calculated. Data is reformatted (in accordance with the known data reformatting techniques of the known Syngo system) to be visualized along the calculated plane as indicated in block 21. Thereafter as shown at block 22, the reformatted data is displayed in a separate window.

The above-described improved 3-D system tool as a three point tool is very useful. MPR's are a widely used tool for medical imaging. In MRI, it is widely used for reformatting cardiac, vascular, and body images. Not only is this system tool useful for MRI imaging purposes, but may also be extended to other modalities of imaging such as by way of example only, computer tomography (CT) imaging.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for generating a planar medical image of a portion of the human anatomy, comprising the steps of: providing a computer having a 3-D stored image of said portion of the human anatomy, creating a first image slice of the 3-D stored image at a first image orientation and depth in a defined direction and defining a first point in the first slice, creating a second image slice of the 3-D stored image at a second image orientation and depth in said defined direction and defining a second point in the second slice, creating a third image slice of the 3-D stored image at a third image orientation and depth in said defined direction and defining a third point in the third slice; calculating a plane in the 3-D stored image described by the three points, creating a fourth image slice of said 3-D stored image as said planar medical image from said calculated plane, and wherein the steps of creating the first image slice, the second image slice, the third image slice, the fourth image slice and calculating a plane are performed using said computer.

2. A method of claim 1 wherein data is reformatted to be visualized along said calculated plane.

3. A method of claim 1 wherein said stored 3-D data set is derived from magnetic resonance imaging.

4. A method of claim 1 wherein said stored 3-D data set is derived from computer tomography imaging.

5. A method of claim 1 wherein said portion of the human anatomy comprises a heart.

6. A method of claim 1 wherein said portion of the human anatomy comprises a coronary artery of the heart.

7. A method of claim 1 wherein the first, second, and third slices comprise 3D stored data or multi-planar reformatted data, and the fourth slice comprises multi-planar reformatted images.

8. A system for generating a planar medical image of a portion of the human anatomy, comprising:
    a computer having a display and a storage which can store a 3-D stored image of said portion of the human anatomy; and
    a computer-readable medium comprising a software program in the computer which
        creates a first image slice of the 3-D stored image at a first image orientation and depth in a defined direction and permits a user to define a first point in the first slice when it is shown on the display,
        creates a second image slice of the 3-D stored image at a second image orientation and depth in said defined direction and permits the user to define a second point in the second slice when it is shown on the display,
        creates a third image slice of the 3-D stored image at a third image orientation and depth in said defined direction and permits the user to define a third point in the third slice when it is shown on the display,
        calculates a plane in the 3-D stored image described by the three points, and
        creates a fourth image slice of said 3-D stored image from said calculated plane which is then shown on the display.

9. A system of claim 8 wherein data is reformatted to be visualized along said calculated plane.

10. A system of claim 8 wherein said stored 3-D data set is derived from magnetic resonance imaging.

11. A system of claim 8 wherein said stored 3-D data set is derived from computer tomography imaging.

12. A system of claim 8 wherein said portion of the human anatomy comprises a heart.

13. A system of claim 8 wherein said portion of the human anatomy comprises a coronary artery of the heart.

14. A system of claim 8 wherein the first, second, and third slices comprise 3-D stored or 3-D multi-planar reformatted images, and the fourth slice comprises multi-planar reformatted images.

15. A computer program product employed in a computer having a 3-D stored image of a portion of the human anatomy for use in generating a planar medical image of said portion of the human anatomy, said computer program performing the steps of:
    creating a first image slice of the 3-D stored image at a first image orientation and depth in a defined direction and defining a first point in the first slice;
    creating a second image slice of the 3-D stored image at a second image orientation and depth in said defined direction and defining a second point in the second slice;
    creating a third image slice of the 3-D stored image at a third image orientation and depth in said defined direction and defining a third point in the third slice;
    calculating a plane in the 3-D stored image described by the three points; and
    creating a fourth image slice of said 3-D stored image as said planar medical image from said calculated plane.

16. A computer readable medium of claim 15 wherein data is reformatted to be visualized along said calculated plane.

17. A computer readable medium of claim 15 wherein said stored 3-D data set is derived from magnetic resonance imaging.

18. A computer readable medium of claim 15 wherein said stored 3-D data set is derived from computer tomography imaging.

19. A computer readable medium of claim 15 wherein said portion of the human anatomy comprises a heart.

20. A computer readable medium of claim 15 wherein said portion of the human anatomy comprises a coronary artery of the heart.

21. A computer readable medium of claim 15 wherein the first, second, and third, slices comprise 3-D stored or 3-D multi-planar reformatted images and the fourth slice comprises multi-planar reformatted images.

* * * * *